Dec. 22, 1964    R. C. ECK    3,162,164
PROTECTIVE MOUNT FOR SENSITIVE INSTRUMENTS
Filed May 7, 1963    2 Sheets-Sheet 1

ROBERT C. ECK
*INVENTOR.*

BY

*ATTORNEYS*

ROBERT C. ECK
INVENTOR.

United States Patent Office 3,162,164
Patented Dec. 22, 1964

3,162,164
PROTECTIVE MOUNT FOR SENSITIVE
INSTRUMENTS
Robert C. Eck, State College, Pa., assignor, by mesne assignments, to the United States of America as represented by the Secretary of the Navy
Filed May 7, 1963, Ser. No. 278,794
7 Claims. (Cl. 114—20)

This invention relates to protective mounts for delicate objects and in particular to shock mounts for sensitive instruments such as gyroscopes and accelerometers.

Heretofore, there existed a problem when it was necessary to transport a high performance vehicle, such as a missile or torpedo, by rail or truck. Ultra-sensitive and delicate instruments within these vehicles were quite often subject to damage from vibration and shock. One method of avoiding this problem was to remove all such instruments from the vehicle and re-install them when the vehicle arrived at its destination. This procedure was costly in both time and accuracy. It is obvious that the preferred situation would be to install such instruments when the vehicles were assembled initially at the point of manufacture. In this way, the instruments can be accurately positioned within the vehicle.

Another solution to this problem was to use resilient shock mounts such as springs, cushions, rubber feet, or the like to mount the instrument within the vehicle. This may solve the transportation problem but when the torpedo is in operation, these types of mounts may prove very unsatisfactory. It is apparent that in the case of instruments which utilize inertia, such as gyroscopes and accelerometers, any freedom of movement with respect to the body of the vehicle, could result in an over-correction because the instruments are not rigidly attached to the vehicle and aligned with its axis.

Take for example, a homing torpedo utilizing a course-correcting gyroscope mounted on flexible rubber feet. While proceeding through the water, the gyroscope senses an error in course. Corrective impulses are sent to the control surfaces and a change in course is started. During the fraction of a second that is required to correct the course, the gyroscope would tend to lag behind the body of the torpedo because of the flexibility of the shock mountings. That is, the inertia of the gyroscope would tend to cause the rubber feet to give during a maneuver rather than hold firm. This small difference between the axis of the torpedo and the momentary change in the axis of the gyroscope may cause the torpedo to miss the target or go into unstable oscillations. The same analogy can be used with guided missiles and other high performance vehicles. It can readily be seen that it is necessary to have instruments like those mentioned above, firmly fixed and accurately positioned within these vehicles.

The invention herein to be described corrects the situation as related above by providing a shock resistant mounting for sensitive instruments which can be installed at initial assembly and test. When the vehicle is to be transported the mount is made flexible and shock resistant allowing atmospheric air pressure to enter the invention. Once the vehicle has arrived at its place of use, the mount can be converted to a rigid, accurately fixed position without disassembling the vehicle by introducing high-pressure fluid or vacuum into the device.

The principal object of this invention is to provide a shock mounting device, which can easily be made rigid or flexible.

Another object of this invention is to provide a shock mounting device on which delicate instruments can be mounted during transportation and which upon arrival can be made rigid.

A further object of this invention is to provide a shock mounting device which permits accurate prelocating of delicate objects prior to shipment, protects them from shock during shipment, and which at arrival can be rigidly secured.

A further object of this invention is to provide a shock mounting device which is fluid damped against vertical and horizontal shocks and accelerations.

Other objects and a fuller understanding of this invention may be had by referring to the following specifications and claims, along with the appended drawings which show some of the preferred embodiments of this invention.

Figure 1:
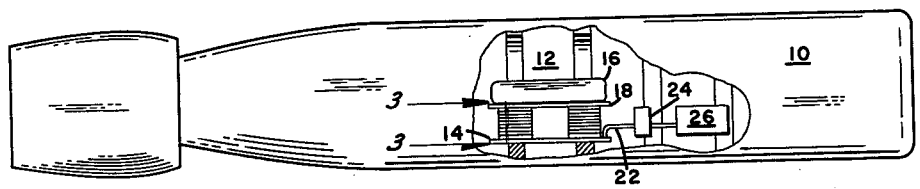
FIGURE 1 is a side view of a marine torpedo with a cut-away section showing this invention mounted therein.

Referring now to the drawings and in particular to FIG. 1, there is shown a marine torpedo 10 in which a preferred embodiment of the protective mount 12 is installed. The base plate 14 of the protective mount 12 is rigidly secured to the body of torpedo 10. Instrument package 16 in which actual practice might be a gyroscope or other like instrument, is firmly fastened to platform 18. Hollow tubing 22 is connected to protective mount 12 leading through solenoid valve 24 to vacuum pump 26.

Figure 2:
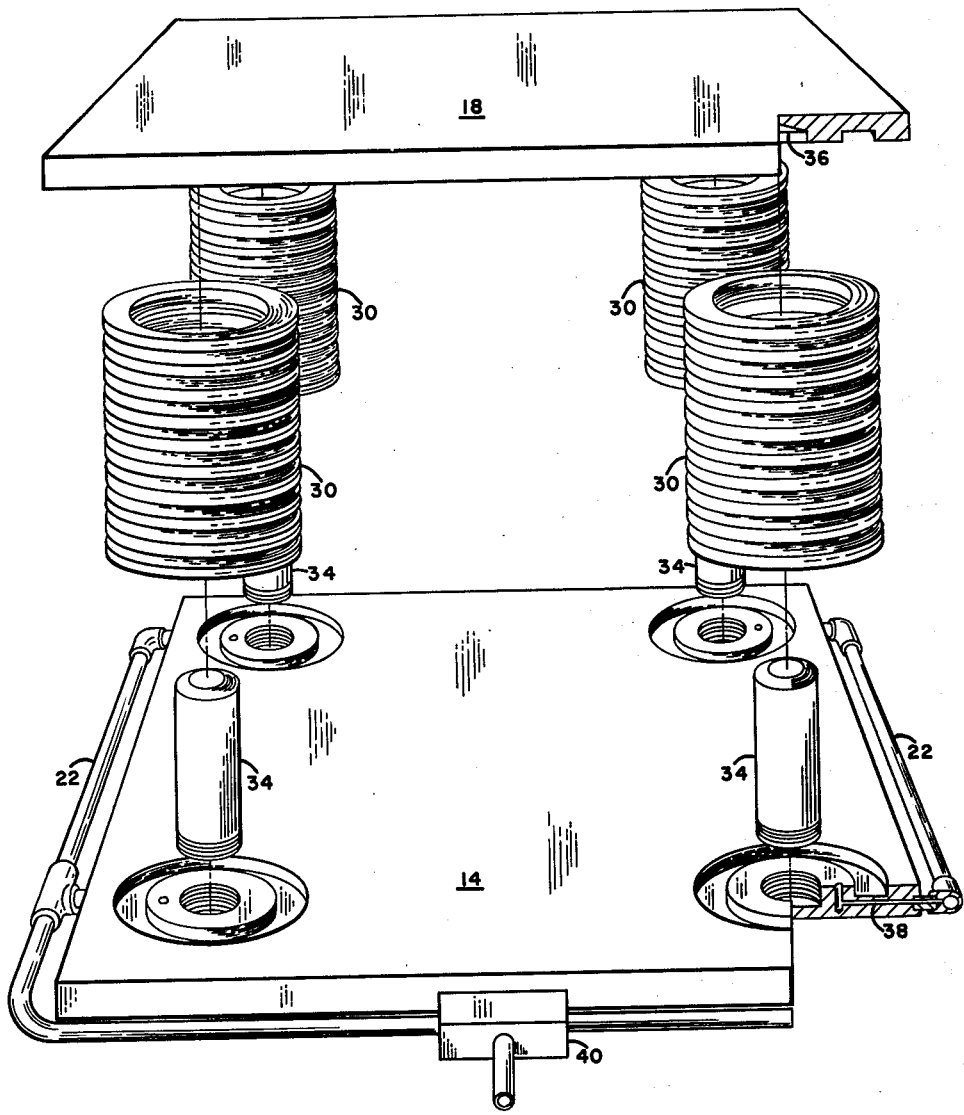
FIGURE 2 is an exploded view of the embodiment of the invention shown in FIG. 1.

Referring now to FIG. 2, base plate 14 has a plurality of metal bellows 30 perpendicularly disposed thereon. The bellows 30 are attached to base plate 14 so as to create a fluid tight seal. In a similar manner, platform 18 is sealed to the upper end of bellows 30 so that it is substantially parallel to base plate 14. Integrally and perpendicularly attached to base plate 14 and concentric with bellows 30 are support posts 34. Mating holes 36 located in platform 18 are positioned on the same centerline as support posts 34. Within base plate 14 are passages 38 leading from the interior of bellows 30 to the edge of base plate 14. These passages 38 should be small enough to prevent air within from escaping rapidly from the bellows 30. Tubing 22 joins passages 38 to a common source of pressure by means of manifold 40.

Figure 3:
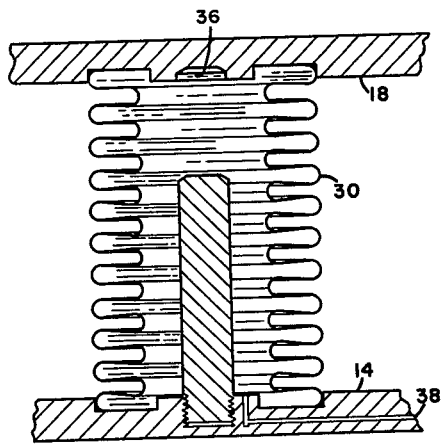
FIGURE 3 is a sectional view taken along line 3—3 of the device of FIG. 2 when assembled and in the shock resistant position.

Referring now to FIG. 3. Bellows 30 is shown in its free state, that is, with atmospheric pressure inside and outside equal. Platform 18 is supported by the natural spring-like tendency of the metal bellows 30. Base plate 14 contains passages 38 through which the fluid passes in and out of the bellows 30.

Figure 4:
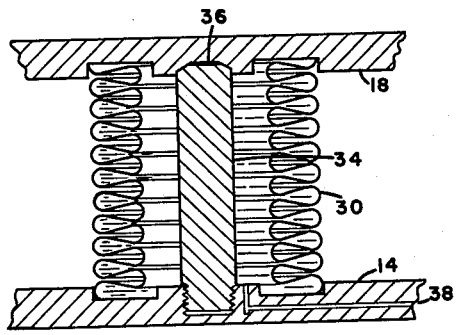
FIGURE 4 is a view of FIG. 3 showing the invention in fixed position.

FIGURE 4 shows the device of FIG. 3 in which the bellows 30 have been evacuated, through passage 38, causing atmospheric pressure to force platform 18 toward base plate 14. Support post 34 is engaged in mating hole 36 thereby making base plate 14, support post 34, and platform 18 a rigid entity.

In operation, an instrument package 16 such as a gyroscope is affixed to the platform 18 of protective mount 12 and the protective mount 12 is in turn rigidly fastened to the body of the torpedo 10 as previously described. The bellows 30, by virtue of their natural spring tendency support the platform 18 and package 16 above the support posts. In addition, the passages 38 within base plate 14 are strictured or made small enough to provide a damping of the bellows by trapping the air within and not allowing it free flow. Thus the bellows 30 will buffer shock by both spring action and by fluid elasticity. During transportation of the torpedo 10, the solenoid valve 24 is positioned to permit atmospheric pressure to be present within the bellows 30. The spring action of the bellows 30 and the damping effect of the air within the bellows 30 protects the instrument package 16 from dynamic forces and vibration.

When the torpedo has arrived at its destination and it is desired to fix the instrument rigidly with respect to the torpedo, it is merely necessary to close solenoid valve 24 and actuate vacuum pump 26 thereby causing platform 18 to descend upon support posts 34 and causing the posts 34 to seat in mating holes 36. In this manner, the instrument package becomes rigidly attached in a predetermined position, to the body of the torpedo 10.

Figure 5:
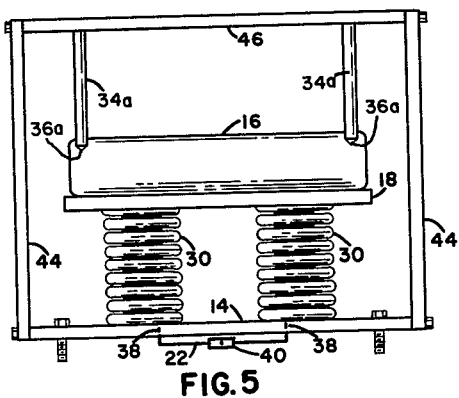
FIGURE 5 is a side view of another embodiment of this invention designed to use fluid pressure as an actuating means.

Referring now to FIG. 5, instrument package 16 is attached to platform 18 which in turn is fastened to the top of bellows 30 in a fluid-tight manner such as soldering or brazing. The bottom portion of bellows 30 is then sealed to base plate 14 which in this embodiment is slightly larger than platform 18. The lower ends of side plates 44 are positioned perpendicular to and affixed to opposing sides of base plate 14. The upper ends are, in a similar manner, affixed to top plate 46 such that it is substantially parallel to platform 18. Integrally attached to top plate 46 are support posts 34a which are directed toward platform 18, the length of support posts 34 is dependent upon the characteristics of the bellows 30 and the load which is to be supported.

As described in FIG. 3, passages 38 connect the interior of the bellows 30 to tubing 22. The tubing 22 from each bellows 30 is in turn connected to a manifold 40 or common connection which permits equal pressure to be introduced in all bellows simultaneously. Damping of the spring action of the bellows is obtained by stricturing the passages 38 to prevent rapid egress of air from within the bellows.

The operation of this embodiment is, for the most part, similar to that previously described except that air pressure instead of vacuum is used as an actuating means. Thus, in this embodiment a pressure tank (not shown) would be used in place of vacuum pump 26. When readying the vehicle 10 for use, air pressure is introduced within the bellows 30 forcing the platform 18 upward so that the support posts 34a seat in the mating holes 36a. By maintaining pressure within the bellows 30, the instrument package 16 can be kept in its fixed, predetermined position.

Although the invention has been described with a certain degree of particularity, it is understood that the present disclosure has been made only by way of example and that numerous changes in the details of construction and the combination and arrangement of parts may be resorted to without departing from the spirit and the scope of the invention as hereinafter claimed.

What is claimed is:
1. In a missile of the type having a guidance instrument rigidly secured thereto when the missile is in operation and being guided toward a target, said instrument being fragile and subject to damage by vibration during transportation to a locus of use, the improvements, in combination, comprising;
    (a) a shock mounting resiliently supporting said instrument for movement in all directions relative to the missile when the missile is vibrating during transportation, whereby vibrating forces applied to the missile are not transmitted to the instrument in sufficient intensity to damage the same,
    (b) registry means for locating the instrument in an accurate predetermined fixed rigid position when the missile is to be readied for operation, and
    (c) means for moving said instrument from its shock mounting position to said fixed and rigid position when desired, whereby the instrument may be rendered free of damaging vibration during transportation and until readied for operation.
2. The combination defined by claim 1 wherein said shock mounting comprises an extensible spring bellows disposed between the instrument and missile, and said means for moving said instrument comprises said bellows and means for establishing a differential gas pressure between the inside and outside of the bellows.
3. The combination defined by claim 2 wherein the last named means comprises a source of suction.
4. The combination defined by claim 2 wherein the last named means comprises a source of gas pressure.
5. The combination defined by claim 2 wherein said registry means comprises, a pin member having a tapered end and a socket member having a tapered aperture for receiving said end, one of said members being affixed to and movable with the instrument and the other being rigidly affixed to the missile.
6. The combination defined by claim 5 wherein said pin member is disposed inside of said bellows.
7. The combination defined by claim 5 wherein said pin member is disposed outside of said bellows.

References Cited by the Examiner
UNITED STATES PATENTS

| | | | |
|---|---|---|---|
| 2,273,306 | 2/42 | Woods | 92—43 |
| 2,273,309 | 2/42 | Zand | 74—5.14 |
| 2,770,434 | 11/56 | McNally | 248—22 |
| 2,923,505 | 2/60 | Immendorf | 248—20 |
| 3,117,800 | 1/64 | Magnuson | 267—64 |

BENJAMIN A. BORCHELT, *Primary Examiner.*
SAMUEL FEINBERG, *Examiner.*